United States Patent
Bock et al.

[19]

[11] Patent Number: 5,855,110

[45] Date of Patent: Jan. 5, 1999

[54] AEROSTATIC BEARING FOR OPEN-END SPINNING DEVICE

[75] Inventors: Erich Bock, Wettstetten; Manfred Knabel; Edmund Schuller, both of Ingolstadt, all of Germany

[73] Assignee: Rieter Ingolstadt Spinnereimaschinenbau AG, Ingolstadt, Germany

[21] Appl. No.: 878,897

[22] Filed: Jun. 19, 1997

[30] Foreign Application Priority Data

Jul. 27, 1996 [DE] Germany .................. 196 30 476.8

[51] Int. Cl.$^6$ ........................................ D01H 4/00
[52] U.S. Cl. .................. 57/406; 57/404; 116/208; 384/121
[58] Field of Search ................ 116/208; 57/404, 57/406; 384/902, 279, 121

[56] References Cited

U.S. PATENT DOCUMENTS

| 3,791,748 | 2/1974 | Goodrich et al. ............ 116/208 |
| 3,813,133 | 5/1974 | Walter et al. . | |
| 3,813,178 | 5/1974 | Herbenar et al. ............ 116/208 |
| 4,095,552 | 6/1978 | Lo . | |
| 4,744,676 | 5/1988 | Lind ............................ 384/279 |
| 4,838,710 | 6/1989 | Ohta et al. . | |
| 5,098,205 | 3/1992 | Zehnbauer et al. ........... 384/902 |
| 5,450,718 | 9/1995 | Knabel et al. ................ 57/404 |
| 5,451,110 | 9/1995 | Gams et al. ................. 384/624 |

FOREIGN PATENT DOCUMENTS

| 0190440 | 8/1986 | European Pat. Off. . |
| 0435016A2 | 7/1991 | European Pat. Off. . |
| 3942612A1 | 6/1991 | Germany . |
| 4316170C1 | 11/1994 | Germany . |

OTHER PUBLICATIONS

German Patent Office Search Report, Jan. 3, 1997.
U.S. Application No. 08/878,898.
EPO Search Report, Nov. 26, 1997.
EPO Patent Abstract of Japan, Publication No. 63289313, Nov. 25, 1988.

Primary Examiner—William Stryjewski
Attorney, Agent, or Firm—Dority & Manning

[57] ABSTRACT

For an aerostatic bearing (6) of an open-end spinning rotor, in which the bearing material consists of a wearable material, a wear indicator (9) is provided on the bearing plate (601) of the axial bearing (6) so that the state of wear of the axial bearing (6) can be checked by simple optical inspection. The wear indicator (9) can be integrated into the running surface (610) and be made e.g. in the form of a blind bore (91), so that the presence of the bore indicates that the wear lies still within the admissible limits.

13 Claims, 2 Drawing Sheets

AEROSTATIC BEARING FOR OPEN-END SPINNING DEVICE

BACKGROUND OF THE INVENTION

The present invention relates to an aerostatic bearing for an open-end spinning device with a spinning rotor.

An open-end spinning device of the type in which the spinning rotor is supported in bearing disks and where an axial force is exerted on the spinning rotor via the bearing disks, whereby the spinning rotor is supported axially by its shaft on an aerostatic axial bearing, is known from EP 0 435 016 A2. It is provided with a bearing plate which, together with the end of the rotor shaft, produces a low-friction pairing of materials. Here the air flows out into the bearing gap from the bearing plate, so that an air cushion forms between the rotor shaft and the bearing plate. In normal operation no contact takes place between the rotor shaft and the bearing plate, so that a practically wear-free axial bearing is provided. In the operation of open-end spinning rotors such rough operating conditions occur however at times, e.g. due to imbalance in the spinning rotor, that contact between the shaft end and the bearing plate does occur. In an open-end spinning rotor, such contact does not at all mean that the aerostatic bearing is damaged as a low-friction pairing of materials is used between rotor shaft and bearing plate. Furthermore, the bearing plate is designed so that it may become worn in case of overload of the axial bearing, so that the bearing is not destroyed rapidly. The wear of the bearing plate of the axial bearing is not much of a problem, but it is important that the spinning rotor, i.e. in particular its axial bearing surface, is not itself subjected to wear due to the wear of the axial bearing. This would practically mean that a new spinning rotor would have to be used, since the spinning rotor would then no longer have a suitable bearing surface and a repair of the bearing surface would be most impractical because of cost and technical reasons. Damage occurs in particular if the bearing plate of the axial bearing, which is made of a wear-resistant carbon material, becomes used up and the rotor shaft then comes into contact with other components of the axial bearing or possibly with a choke which is usually made of a metallic sintered material. Spinning operation is hardly possible any more with a heavily worn or damaged axial bearing because the fibers are no longer fed correctly into the spinning rotor. In spite of this, it occurs in practice that spinning rotors, together with an already heavily worn axial bearing, are continued in operation because the fact that the axial bearing is worn is not recognized.

EP 0 190 440 A2 also discloses an open-end spinning device of this type in which the spinning rotor bears axially upon an aerostatic axial bearing. Since this is a spinning rotor without shaft, it bears directly upon its axial bearing. The bearing plate in this case is ring-shaped, as a magnet is provided in the center so that an axially acting force is exerted upon the spinning rotor. Compressed air is conveyed via the bearing plate into the bearing gap between spinning rotor and bearing plate. A bearing plate which has been worn beyond an admissible value can here also lead to damage or destruction of the spinning rotor or even of its drive.

OBJECTS AND SUMMARY OF THE INVENTION

It is a principal object of the present invention to design an open-end spinning rotor of the type mentioned initially in such a manner that wear of the bearing plate becomes recognizable so that damage to the spinning rotor may be avoided. Additional objects and advantages of the invention will be set forth in part in the following description, or may be obvious from the description, or may be learned through practice of the invention.

The design of the open-end spinning device according to the invention, in which a wear indicator is attached to the bearing plate of the axial bearing, improves the maintenance of the axial bearing considerably. The wear indicator enables the maintenance personnel in the first place to check also the state of the axial bearing during routine interventions at the spinning device, e.g. replacement of the rotor. The axial bearing is, as a rule, of difficult access and not well visible in the open-end spinning device, so that the maintenance person is able to recognize a change in the state of the axial bearing only if a clear change has occurred on the axial bearing. It is especially advantageous here to design the wear indicator in the form of an optical wear indicator which is integrated into the running surface of the axial bearing. The running surface is practically the only part of the axial bearing that is visible to the maintenance person without major disassembly of the spinning device. The running surface and its state can be ascertained by removing the open-end spinning rotor. A wear indicator in the form of a bore in the bearing plate is especially advantageous because this makes it especially easy to recognize a clear change in the bearing surface of the bearing plate when its surface has been eroded by wear. It is especially advantageous to make the bore in the form of a blind bore, the open end of which is towards the spinning rotor. Upon removal of the shaft of the spinning rotor from the open-end spinning device, it is then easy to check optically whether a bore can still be seen in the bearing plate. If this is the case, the wear which has occurred up to that point can still be tolerated. In the opposite case however, if the bearing surface of the bearing plate is smooth, this means that the material erosion has progressed to such a point that the blind bore originally made in the bearing plate has disappeared due to erosion of its surrounding material. The depth of the blind bore is therefore a measure for the admissible material erosion due to wear. If the blind bore can no longer be recognized, the wear limit of the bearing has been reached. In another advantageous embodiment of the invention a bore is made from the opposite side in the bearing plate. In this case the wear limit is reached when a bore becomes visible in the bearing plate, and then so much material has been eroded that the axial bearing must be replaced. In this case, it is not the depth of the bore which is the measure of the admissible wear of the bearing, but the material thickness originally present between the bore and the bearing surface of the bearing plate. The wear indicator in the form of a bore is especially advantageous if the diameter of the bore is between 0.5 and 1.5 mm, preferably 1.0 mm. This makes it possible for the wear indicator to be clearly visible while nevertheless containing only a small volume air, so that the bearing has the required rigidity.

In another advantageous embodiment of the invention, the wear indicator is in the form of an extension, the side of which towards the spinning rotor interacts with same. The extension has a predetermined length in the axial direction. Advantageously, it has a smaller diameter than the part of the axial bearing on which it is located. In this embodiment of the invention, the indicator becomes especially visible because once the extension has been eroded by wear, the surface of the bearing plate constitutes one single large surface.

In another advantageous embodiment of the invention the bearing plate is given a thickness of over 2 mm. As a result, it is mechanically stable and also has enough material so that it can wear without immediately resulting in any damage. A thickness from 2.5 to 4 mm is especially advantageous.

In another advantageous embodiment of the invention, the bearing plate is made of a material which is permeable to air, so that no aeration bores are required which allow the air to enter the bearing gap. Instead, the air escapes over the entire surface from the bearing plate. It is advantageous to make the bearing plate at the same time as a choke for the compressed air, so that the bearing may be sufficiently rigid.

In another advantageous further development of the invention, the bearing plate is provided with bores on the side away from the spinning rotor. The bores serve to guide the compressed air, to which they are connected, into proximity of the outlet surface where it escapes from the bearing plate. These bores make it possible for the bearing plate to be made very large also in the axial direction, so that it may be sufficiently stable to be pressed into a holder. At the same time, the bores offer the advantage that the air need not go through the entire axial length of the bearing plate. As a result, the throttling effect of a massive bearing plate is not too great, so that the air flow going into the bearing gap is not impeded.

The invention is described below through drawings.

DETAILED DESCRIPTION OF THE PREFERRED EMBODIMENTS

Figure 1:
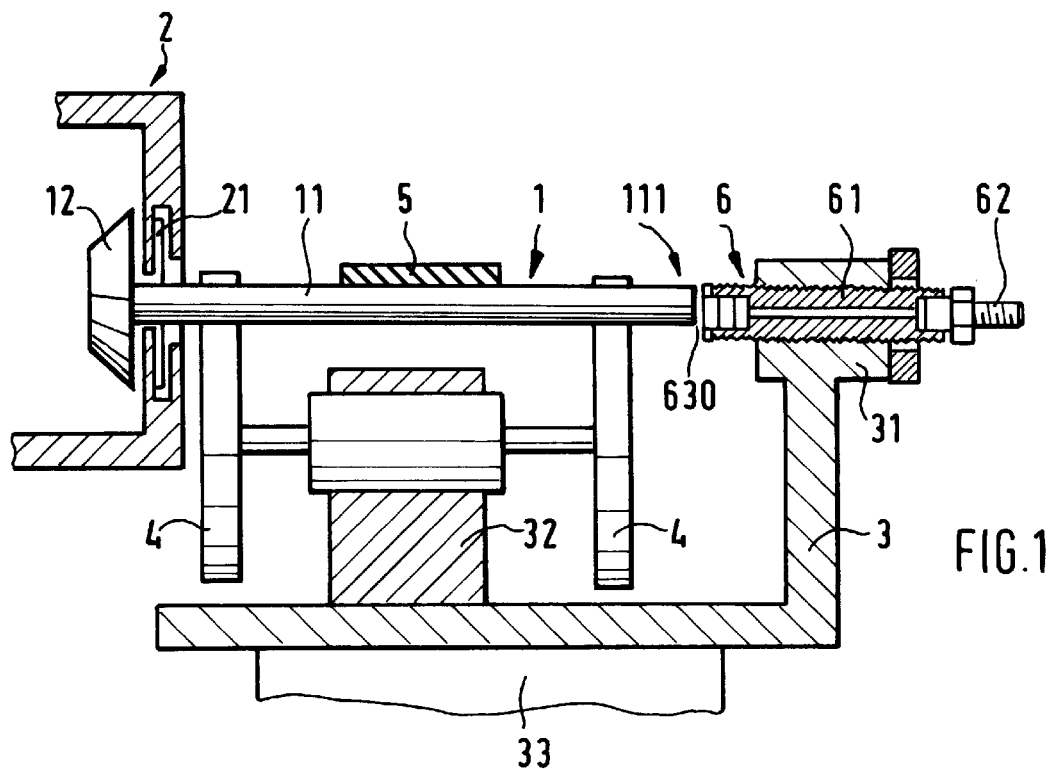
FIG. 1 shows an open-end spinning device according to the invention, in a section.

Reference will now be made in detail to the presently preferred embodiments of the invention, one or more examples of which are illustrated in the drawings. Each example is provided by way of explanation of the invention, and not as a limitation of the invention. For example, features illustrated or described as part of one embodiment can be used on another embodiment to yield still a further embodiment. It is intended that the present invention include such modifications and variations without departing from the scope and spirit of the invention.

FIG. 1 shows a open-end spinning device according to the invention, in a section. As an example this is a description of a spinning device in which the spinning rotor is supported via a shaft. The essential components of such an open-end spinning device are the spinning rotor 1 with its shaft 11 and the rotor plate 12, the rotor housing 2 with the rotor housing seal 21, the bearing block 3 with a bearing seat 31 for the axial bearing 6 and a seat 32 to support the bearing disks 4, the bearing disks 4 to receive the rotor shaft, the drive means 5, a tangential belt to drive the spinning rotor 1, and the axial bearing 6 for axial support of the shaft 11. The shaft 11 reaches with its end supporting the rotor plate 12 through the rotor housing seal 21 into the rotor housing 2.

The axial bearing 6 is held in a holder 61 which in FIG. 1 is in the form of an adjusting screw. The axial bearing 6 is located across from the free end 111 of the shaft 11. The bearing seat 31 is provided for this with a bore with threads into which the adjusting screw can be screwed adjustably in the axial direction. A counter-nut is used to secure it. On the end of the adjusting screw away from the axial bearing, the connection 62 is provided for the arrival of compressed air to the axial bearing 6. The bearing gap 630 extends between the axial bearing 6 and the shaft end 111. An axial force is applied in a known manner on open-end spinning devices of this type, bearing in this case on the free end 111 of the shaft 11. The axial force on the rotor shaft is here produced by bearing disks 4 positioned at an angle. It is however just as possible to produce the axial force component, e.g. by means of a drive belt running at an angle to the rotor shaft, or also by means of an inclined pressing or driving disk or also by means of magnetic forces. The open-end spinning device is attached on a support 33 which is part of the appertaining spinning machine.

Figure 2:
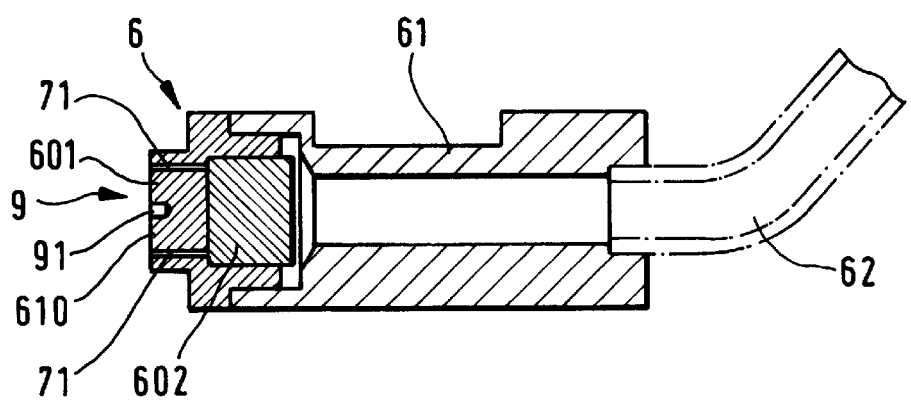
FIG. 2 shows an axial bearing designed according to the invention and placed in a holder.

FIG. 2 shows a section through an embodiment of the axial bearing 6 according to the invention which is held in a holder 61. On its side away from the axial bearing 6, the holder 61 is provided with a connection 62 for compressed air. The holder 61 is provided with a centered bore over its entire length through which air flows to the axial bearing 6. The axial bearing 6 in the embodiment of FIG. 2 consists of the bearing plate 601 which has several bores 71, through which the air goes into the bearing gap. A choke 602 through which the air throughput is directed precedes the bores 71. In the running surface 610 of the axial bearing 6, a centered blind bore 91 is made to serve as the wear indicator 9. The depth of the blind bore is 0.5 mm, its diameter is 1.0 mm. The bearing plate 601 consists of a wearable carbon material. Through contact with the shaft 11 of the open-end spinning device, wear occurs on the bearing plate 601, resulting in material erosion above the area of the blind bore. Once the erosion equals the depth of the blind bore 91, the result is a bearing plate 601 with a flat surface in the center, since the blind bore 91 has disappeared. This is an indication for the maintenance person to replace the axial bearing 6 with a new one.

Figure 3:
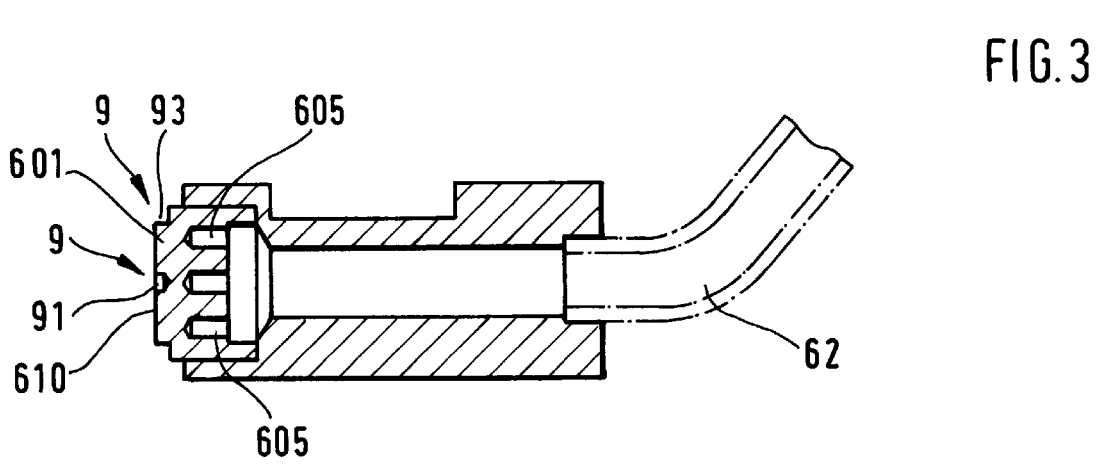
FIG. 3 shows an axial bearing similar to FIG. 2, with a modified bearing plate.

FIG. 3 shows a holder 61 with an axial bearing 6 similar to that of FIG. 2, however the holder is not made in the form of an adjusting screw. The bearing plate 601 is an alternative of that of FIG. 2. The bearing plate 601 is made permeable to compressed air, so that no bores (compare with bore 71 in FIG. 2) are necessary to guide compressed air into the bearing gap of the axial bearing. To avoid excessive throttling of the air as it passes through the bearing plate, said bearing plate 601 is advantageously provided with bores 605 on the side away from the bearing plate 601, so that the compressed air may be conveyed closer to the running surface 610 of the bearing plate 601. The air need not flow through the entire axial length of the bearing plate 601. This provides sufficient air in the bearing gap. The special design of the bearing plate 601 with the bores 605 extending in the axial direction makes it possible with this embodiment to omit a choke as required in FIG. 2.

The bearing plate 601 in FIG. 3 is provided with two wear indicators 9, whereby one is made in the form of a blind bore 91, as in FIG. 2, and the other in the form of an extension 93. The extension supports the running surface 610 and has a smaller diameter than the remaining portion of the bearing plate 601. This makes it possible to see the step between the extension 93 and the rest of the bearing plate 601. If wear now occurs on the bearing plate 601, the extension 93 is worn off by the rotor shaft until the diameter transition to the remaining part of the bearing plate 601 has disappeared. This indicates to the operator of the machine that the axial bearing at this spinning station must be replaced. An embodiment of the bearing system with two different wear indicators is not absolutely necessary. One is sufficient by itself.

Figure 4:
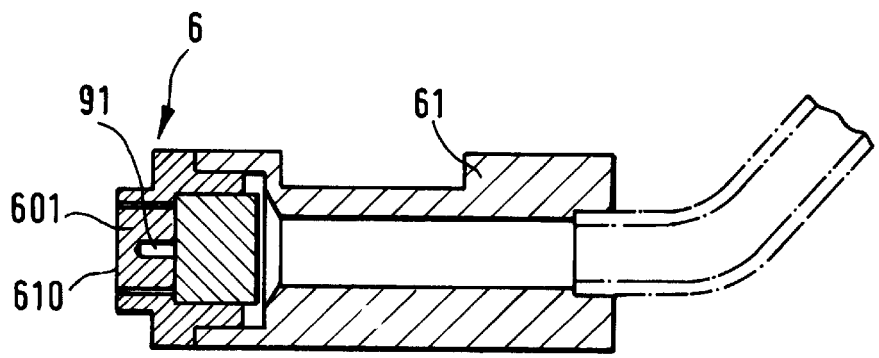
FIG. 4 shows a bearing plate with a wear indicator of different design.

FIG. 4 shows an axial bearing 6 similar to that of FIG. 2. Only the blind bore 91 is made in the bearing plate 601 on the side away from the running surface 610. This means that in case of wear of the running surface 610, the blind bore 91 is exposed and becomes visible to the maintenance person. This indicates that the axial bearing must be replaced because the wear limit has been reached. The blind bore 91 is given an appropriate depth in the bearing plate 601 so that originally just so much material is present between the end of the blind bore and the running surface 610 as may be eroded by wear without damage to the bearing of the spinning rotor.

Figure 5A:
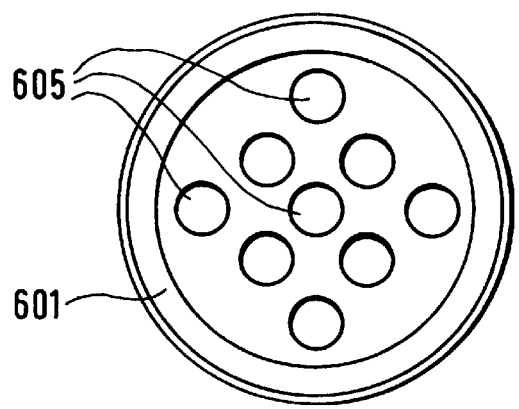
FIG. 5a shows a top view of the side of a bearing plate away from the spinning rotor.

FIG. 5*a* shows the bearing plate 601 of FIG. 3 in a top view on the side away from the running surface 610. The bores 605 by means of which the compressed air can be conveyed to an advantageous depth into the bearing plate 601 can be seen in the top view of this drawing. In the present instance there are nine bores, with four and four being equidistant from each other along a circular line. The ninth bore is located in the center of the plate and is coaxial with the blind bore 91 (see FIG. 3). The design of the bearing plate 601 with the bores 605 makes it possible to give the bearing plate especially good mechanical stability, whereby care is taken at the same time that sufficient air can flow through the bearing plate. A separate nozzle can be omitted.

Figure 5B:
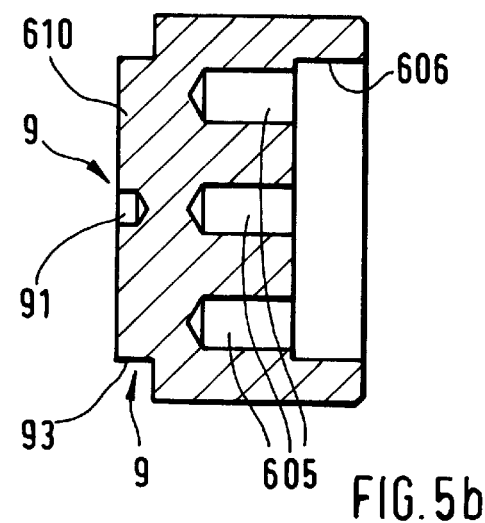
FIG. 5b shows a side view of the bearing plate of FIG. 5a, in a section.

FIG. 5*b* shows the left side view of the bearing plate 601 of FIG. 5*a* in a cross-section. The running surface 610 has a centered wear indicator 9 which is made in form of a blind bore 91. The extension 93, which constitutes a second wear indicator 9, is also shown. The bores 605 in the bearing plate 601 merge into a recess 606 in the bearing plate at their end across from the running surface 610. This makes it possible to facilitate the production of the bearing plate 601 since the bores 605 are easier to make.

Figure 6A:
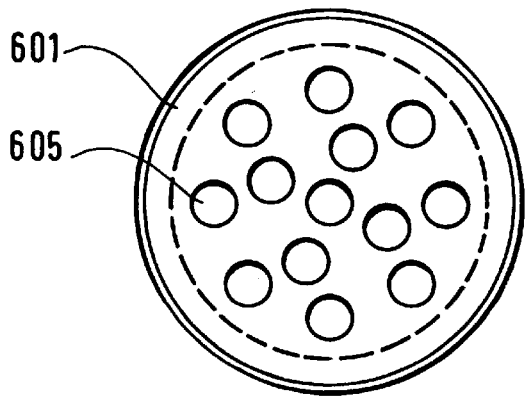
FIG. 6a shows a top view of the side of a bearing plate away from the spinning rotor.
Figure 6B:
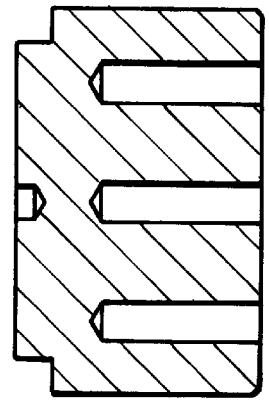
FIG. 6b shows the side view of the bearing plate of FIG. 6a, in a section.

FIG. 6*b* shows a bearing plate 601 from the side away from the running surface 610. Here the bores 605 are smaller and their number is much greater than in FIG. 5*a*. As a result a better and more even distribution of air can be attained in the bearing gap of the axial bearing. FIG. 6*b* shows the left side view of FIG. 6*a*, in a section.

It should be apparent to those skilled in the art that various modifications and variations can be made in the present invention without departing from the scope and spirit of the invention. For example, features illustrated or described as part of one embodiment can be used on another embodiment to yield still a third embodiment. It is intended that the present invention cover such modifications and variations as come within the scope of the appended claims and their equivalents.

We claim:

1. An open-end spinning device with a spinning rotor having a shaft with a free end wherein an axially acting force is exerted on said spinning rotor towards said free end, said spinning device further comprising an axial aerostatic bearing disposed opposite said shaft free end so that a bearing gap is defined between said aerostatic bearing and said shaft free end, said aerostatic bearing comprising a bearing plate having a running surface facing said shaft free end and a side away from said shaft free end, said bearing plate comprising at least one wear indicator defined on at least one of said running surface or said side away from said shaft free end, said wear indicator comprising a structural component of said running surface or said side away from said shaft free end having a first visual appearance during a first wear condition of said bearing plate, said structural component changing to a second visual appearance at a point of further wear of said bearing plate thereby providing a visual warning of an undesired wear condition of said plate.

2. The device as in claim 1, wherein said wear indicator is formed integral with said running surface.

3. The device as in claim 1, wherein said wear indicator comprises a bore having a defined length less than that of said bearing plate.

4. The device as in claim 3, wherein said bore is defined in said side away from shaft free end.

5. The device as in claim 4, wherein said bore comprises a closed end which is at an axial distance from said running surface equal to an acceptable axial wear length of said running surface.

6. The device as in claim 3, wherein said bore is defined in said running surface.

7. The device as in claim 6, wherein said bore comprises an axial length equal to an acceptable wear length of said bearing plate in the axial direction.

8. The device as in claim 3, wherein said bore comprises a diameter generally between 0.5 and 1.5 mm.

9. The device as in claim 1, wherein said wear indicator comprises an extension member extending from said bearing plate and facing said shaft free end, said extension member comprising an axial length corresponding to an acceptable wear length of said bearing plate in the axial direction.

10. The device as in claim 1, wherein said bearing plate comprises an axial length of generally between 3.5 and 5.0 mm.

11. The device as in claim 1, wherein said bearing plate is permeable to compressed air.

12. The device as in claim 11, wherein said bearing plate further comprises air bores defined in said side away from said shaft free end and extend towards said running surface, said air bores in communication with a source of compressed air.

13. The device as in claim 12, wherein said wear indicator comprises a bore defined in said running surface and extending axially towards said side away from said shaft free end.

* * * * *